US006612788B2

(12) United States Patent
Thomas et al.

(10) Patent No.: US 6,612,788 B2
(45) Date of Patent: Sep. 2, 2003

(54) SELF-FEED WOOD BIT

(75) Inventors: Rickey J. Thomas, Manchester, MD (US); Michael P. Peters, Lutherville, MD (US)

(73) Assignee: Black & Decker Inc., Newark, DE (US)

( * ) Notice: Subject to any disclaimer, the term of this patent is extended or adjusted under 35 U.S.C. 154(b) by 63 days.

(21) Appl. No.: 09/989,503

(22) Filed: Nov. 20, 2001

(65) Prior Publication Data

US 2002/0141838 A1 Oct. 3, 2002

Related U.S. Application Data

(60) Provisional application No. 60/280,020, filed on Mar. 30, 2001.

(51) Int. Cl.[7] .......... B23B 51/02

(52) U.S. Cl. .......... 408/214; 408/225; 408/227

(58) Field of Search .......... 408/200, 201, 408/214, 225, 223, 224, 227, 713

(56) References Cited

U.S. PATENT DOCUMENTS

| | | | | | |
|---|---|---|---|---|---|
| 781,652 | A | | 2/1905 | Hiatt | |
| 1,004,902 | A | * | 10/1911 | Potter | 408/214 |
| 1,185,380 | A | * | 5/1916 | Davis | 408/205 |
| 1,321,007 | A | | 11/1919 | Butler | |
| 1,444,626 | A | * | 2/1923 | Maxim | 408/229 |
| 2,358,077 | A | * | 9/1944 | Koett | 408/213 |
| 2,576,376 | A | | 11/1951 | Wilson | |
| 2,883,888 | A | * | 4/1959 | Stewart | 76/102 |
| 3,945,753 | A | | 3/1976 | Byers et al. | |
| 4,134,706 | A | | 1/1979 | Stewart | |
| 4,244,667 | A | | 1/1981 | Timmons | |
| 5,312,207 | A | | 5/1994 | Pomp | |
| 5,695,304 | A | | 12/1997 | Ebert | |
| 5,820,319 | A | * | 10/1998 | Hull et al. | 408/214 |
| 5,975,814 | A | | 11/1999 | Pomp | |
| 6,354,773 | B1 | * | 3/2002 | Konen | 408/213 |
| 6,354,774 | B1 | * | 3/2002 | Haughton et al. | 408/225 |
| 2001/0019687 | A1 | * | 9/2001 | Eberhard | 408/211 |
| 2001/0031178 | A1 | * | 10/2001 | Remke et al. | 408/1 R |

FOREIGN PATENT DOCUMENTS

| | | |
|---|---|---|
| DE | 28 11 451.4 | 9/1978 |
| DE | 27 33 395 C2 | 12/1982 |
| DE | 37 38 000 A1 | 5/1989 |
| DE | 89 06 443.7 | 8/1989 |
| DE | 91 01 478.6 | 6/1991 |
| DE | 195 45 084 C1 | 7/1997 |
| DE | 299 06 495 U1 | 11/1999 |
| DE | 299 11 945 U1 | 11/1999 |
| DE | 200 06 541 U1 | 9/2000 |

* cited by examiner

*Primary Examiner*—Daniel W. Howell
(74) *Attorney, Agent, or Firm*—Harness, Dickey & Pierce P.L.C.

(57) ABSTRACT

A large diameter self-feed wood bit is provided including a feed spur having a coarse spur thread of approximately 1.75 millimeters and a 20-degree main cutting edge relief angle. The main cutting edge relief angle complements the coarse self-feed thread pitch for faster, more efficient drilling of large diameter holes in wood.

20 Claims, 2 Drawing Sheets

SELF-FEED WOOD BIT

CROSS-REFERENCE TO RELATED APPLICATIONS

This application claims the benefit of U.S. Provisional Application No. 60/280,020, filed Mar. 30, 2001.

FIELD OF THE INVENTION

The present invention relates to a self-feed wood bit, and more particularly, to a self-feed wood bit having a feed spur having a coarse spur thread.

BACKGROUND AND SUMMARY OF THE INVENTION

Self-feed wood bits are used for boring a hole through wood. The typical self-feed wood bit includes a fine thread feed spur and one or more main cutting edges extending radially outward from the center and including scoring perimeter teeth. The feed spurs are typically provided with a fine thread which acts somewhat like a screw in order to draw the self-feed wood bit into the wood so that the main cutting edge cuts away the surface of the wood. The feed spur is typically provided with a fine thread in order to limit the speed at which the main cutting edge is drawn into the wood in order to prevent binding of the wood bit which occurs if the wood bit is drawn inward too quickly. It is desirable in the art of wood bits to provide a wood bit which provides faster drilling, improved efficiency, and improved self feeding. These and other objects are obtained by providing a self-feed wood bit with a coarse thread on the feed spur and with an approximately 20 degree relief angle on the main cutting edge.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
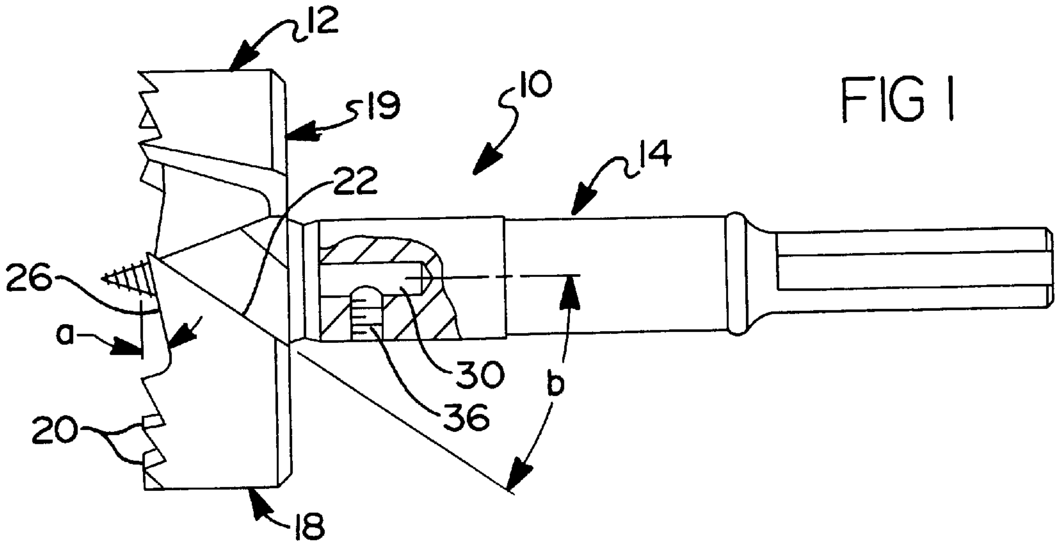
FIG. 1 is a plan view of a self-feed wood bit, according to the principles of the present invention.

The following description of the preferred embodiment(s) is merely exemplary in nature and is in no way intended to limit the invention, its application, or uses.

With reference to FIGS. 1–5, the self-feed wood bit 10 according to the present invention will now be described. The self-feed wood bit includes a cutting body portion 12 and a shank 14 extending from the main body portion 12. The main body 12 includes a pair of main cutting edges 16 and a pair of following cylindrical wall portions 18, each of which include a plurality of scoring perimeter teeth 20. The pair of main cutting edges 16 each include a rake face 22 having a rake angle "b" of approximately 30 degrees. As can best be seen in FIGS. 4 and 5, the substantially planar surface of the rake face 22 extends throughout the overall vertical depth of the main body portion 12. The main cutting edges 16 also include a relief face 26 (best shown in FIG. 1) having a main cutting edge relief angle "a" (shown in FIG. 1) from about 15 degrees to about 25 degrees and preferably approximately 20 degrees.

Figure 2:
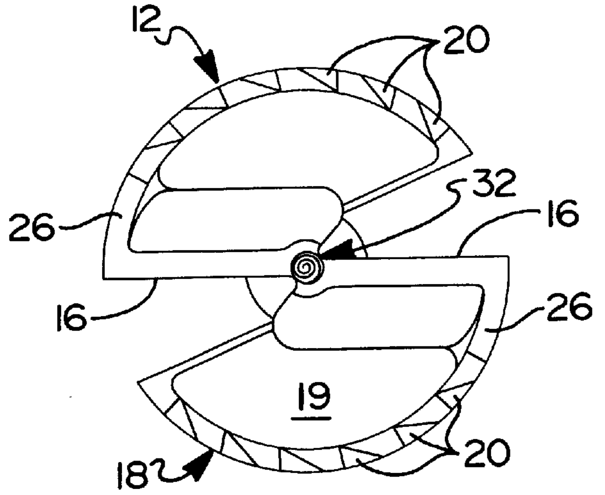
FIG. 2 is an end view of the self-feed wood bit.
Figure 3:
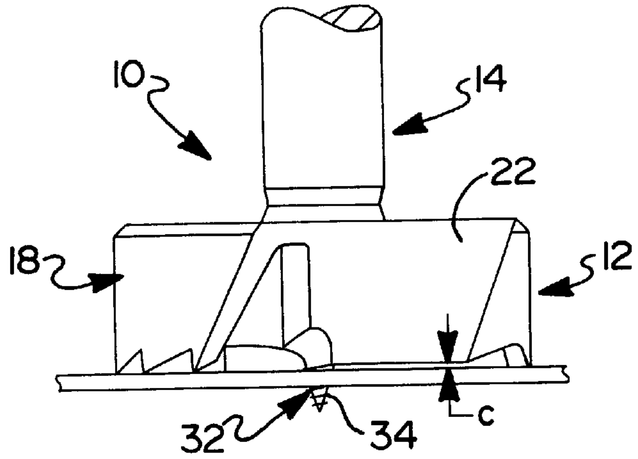
FIG. 3 is a side view from a different angle of the self-feed wood bit engaged with a wood surface.
Figure 4:
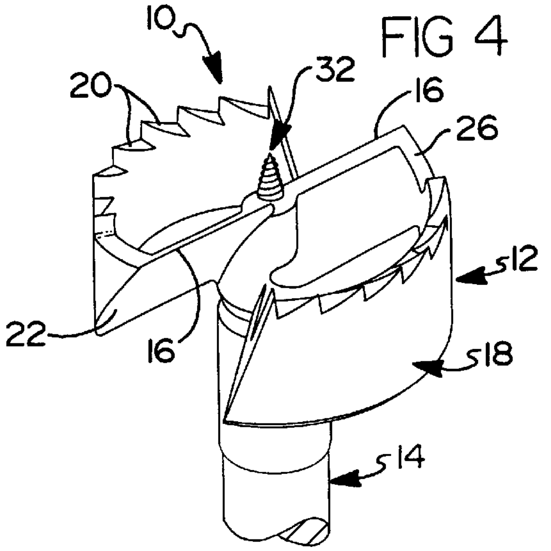
FIG. 4 is a perspective view of the self-feed wood bit.
Figure 5:
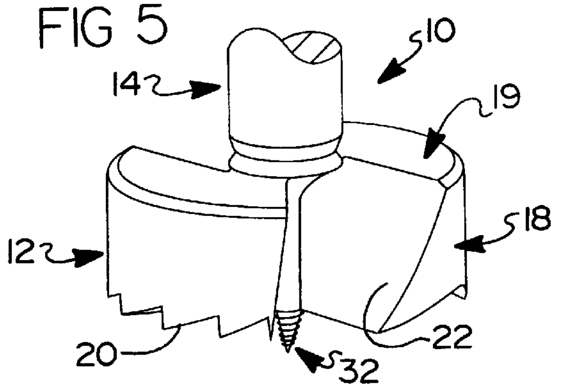
FIG. 5 is a perspective view from a back side of the self-feed wood bit.
Figure 6:
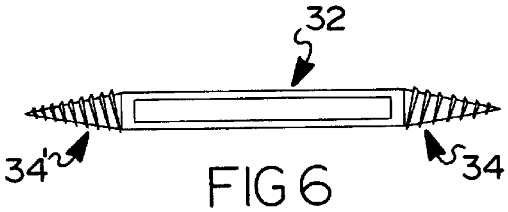
FIG. 6 is a side view of a double ended feed spur.
Figure 7:
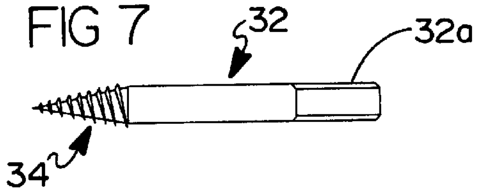
FIG. 7 is a side view of a single-ended feed spur.

The scoring perimeter teeth 20 extend a distance "c" approximately 1⁄32 of an inch longer than the main cutting edge 16 as best shown in FIG. 3. As seen best in FIG. 1, the scoring perimeter teeth 20 are regularly disposed on the following cylindrical wall portion 18 except that the regular disposition of the scoring perimeter teeth 20 are interrupted by the relief angle "a" of the main cutting edges 16. As seen best in FIGS. 4 and 5, the cylindrical wall portion 18 terminates at an angle which is open relative to the other, opposing rake face 22. As best seen in FIG. 2, the main body portion 12 also includes a horizontal top wall portion 19 associated with the cylindrical wall portion 18 which terminates at an angle which is open relative to the other, opposing main cutting edge 16. The main body portion 12 and shank 14 are provided with an axial bore 30 which receives a feed spur 32 therein. The feed spur 32 includes a shank portion 32*a* and a self-feeding spur portion 34. The shank portion 32*a* of the feed spur 32 is retained in the bore 30 by a set screw 36 which is received in a threaded bore in the side of the shank 14 of the self-feed wood bit 10. The feed spur 32 can be a double-ended feed spur as shown in FIG. 6 or a single-ended feed spur as shown in FIG. 7. The double-ended feed spur shown in FIG. 6 includes two self-feeding spur portions 34 and 34'. The double-ended feed spur of FIG. 6 can be provided with a feed spur 34 having a coarse thread, according to the principles of the present invention, and a feed spur 34' having a fine thread. Alternately, as shown in FIG. 7, the feed spur 32 can be provided with a single self-feeding spur portion 34 which may have a coarse thread according to the principles of the present invention as will be described in greater detail herein.

Figure 8:
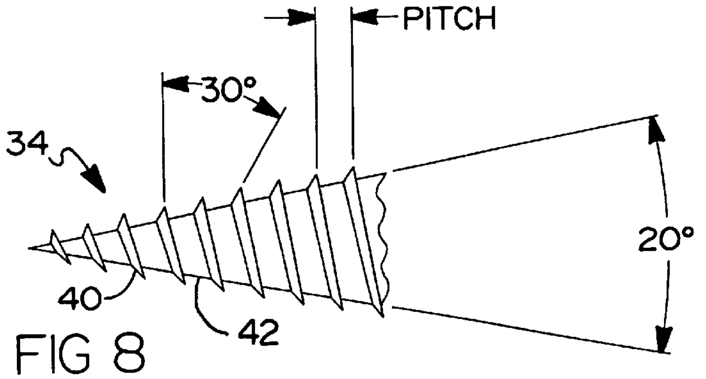
FIG. 8 is a side view showing the thread detail of the course thread feed spur according to the principles of the present invention.

As shown in FIG. 8, the thread detail of the self-feeding spur 34 will now be described. As shown in FIG. 8, the spur 34 is provided with a thread 40 on a conical base portion 42. The pitch distance between the threads 42 defines a coarse thread. For purposes of this application, the term "coarse thread" is used to define a thread having a pitch distance from about 1.65 millimeters to about 1.85 millimeters and preferably about 1.75 millimeters. The feed spur includes a thread length on the spur portion that extends into the cutter body to provide self-feeding action throughout completion of the hole (i.e., out the back side of the surface being cut).

Experimental Results

A course thread feed spur was tested with a self-feed wood bit having a main cutting edge relief angle "a" of 20 degrees and a pitch distance of the thread of the feed spur of 1.75 mm. The test was performed with a $2^{9/16}$ inch diameter wood bit and compared with three other commercially available fine spur thread wood bits. The wood bit, according to the present invention, performed a cutting operation in approximately 5.8 seconds in comparison with each of the other commercially available bits which performed the same cut through the same material in approximately 7.1, 7.7, and 7.2 seconds, respectively. Accordingly, the coarse thread self-feed wood bit, according to the present invention, was approximately 18 percent faster in performing a cut than the commercially available finer thread wood bits. The main cut edge relief angle is 20 degrees to complement the coarse self-feed thread pitch of 1.75 mm for faster, more efficient drilling of large diameter holes in wood.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A self-feed wood bit for fast, efficient drilling comprising:

(a) at least two radially extending main cutting edges, each main cutting edge including a rake face and a relief face having a relief angle from about 15 degrees to about 25 degrees; and (b) a feed spur disposed at a center portion of said main cutting edges, said feed spur having a coarse thread pitch; and (c) a plurality of perimeter scoring teeth disposed around an outer periphery of said self feed wood bit.

2. A self feed wood bit according to claim 1, wherein said rake face is a substantially planar surface.

3. A self feed wood bit according to claim 1, wherein said rake face includes a rake angle of about 30 degrees.

4. A self feed wood bit according to claim 1 wherein said rake face extends to said outer periphery of said self feed wood bit.

5. A self feed wood bit according to claim 1, wherein said feed spur is a separate component releasably retained within a bore disposed at the center portion of said main cutting edges.

6. A self feed wood bit for fast, efficient drilling comprising:

(a) a main body portion having an overall vertical depth;

(b) at least two radially extending main cutting edges, each having a rake face which provides a substantially planar surface extending throughout said vertical depth of the main body, each radially extending main cutting edge also including a relief angle from about 15 degrees to about 25 degrees; and (c) a feed spur disposed at a center portion of the pair of main cutting edges, said feed spur having a coarse thread pitch.

7. A self feed wood bit according to claim 6 wherein said rake face extends to said outer periphery of said self feed wood bit.

8. A self feed wood bit according to claim 6 wherein said relief angle is about 20 degrees and said course thread pitch is about 1.75 millimeters.

9. A self feed wood bit according to claim 8, wherein said rake face includes a rake angle of approximately 30 degrees.

10. A self feed wood bit according to claim 7, wherein said feed spur is a separate component releasably retained within a bore disposed at the center portion of said main cutting edges.

11. A self feed wood bit for fast, efficient drilling comprising:

(a) at least two radially extending main cutting edges, each having a relief angle from about 15 degrees to about 25 degrees;

(b) a feed spur disposed at a center portion of the radial extending main cutting edges, said feed spur having a coarse thread pitch; and (c) a following cylindrical wall portion associated with each main cutting edge, the cylindrical wall portion having a plurality of scoring perimeter teeth regularly disposed thereon, except that the regular disposition of the scoring perimeter teeth are interrupted by the relief angle of the main cutting edges, the main cutting edges extending from said feed spur through said cylindrical wall portion.

12. A self feed wood bit according to claim 11, wherein said rake face is a substantially planar surface.

13. A self feed wood bit according to claim 12, wherein said rake face includes a rake angle of about 30 degrees.

14. A self feed wood bit according to claim 11, wherein said feed spur is a separate component releasably retained within a bore disposed at the center portion of said main cutting edges.

15. A self feed wood bit according to claim 14, wherein said feed spur includes a fine thread pitch disposed at an end opposite from the course thread pitch.

16. A self feed wood bit for fast, efficient drilling comprising:

(a) at least two radially extending main cutting edges, each radially extending main cutting edge having a rake face and a relief angle from about 15 degrees to about 25 degrees;

(b) a feed spur disposed at a center portion of the pair of main cutting edges, said feed spur having a coarse thread pitch;

(c) a following cylindrical wall portion associated with one of the main cutting edges, the cylindrical wall portion terminating at an angle which is open relative to an opposing rake face; and (d) a horizontal top wall portion associated with the cylindrical wall portion, the horizontal top wall portion terminating at an angle which is open relative to an opposing main cutting edge.

17. A self feed wood bit according to claim 16, further comprising a plurality of scoring perimeter teeth regularly disposed on the cylindrical wall portion, except that the regular disposition of the scoring perimeter teeth are interrupted by the relief angle of the main cutting edges, the main cutting edges extending from said feed spur through said cylindrical wall portion.

18. A self feed wood bit according to claim 16, wherein said rake face is a substantially planar surface.

19. A self feed wood bit according to claim 17, wherein said perimeter teeth extend about 1/32 of an inch beyond main cutting edges.

20. A self feed wood bit according to claim 17, wherein said feed spur is a separate component releasably retained within a bore disposed at the center portion of said main cutting edges.

* * * * *